United States Patent [19]
Ryan

[11] Patent Number: 5,953,193
[45] Date of Patent: Sep. 14, 1999

[54] POWER SURGE PROTECTION ASSEMBLY

[75] Inventor: Barry D. Ryan, Coeur d'Alene, Id.

[73] Assignee: A.C. Data Systems, Inc., Coeur d'Alene, Id.

[21] Appl. No.: 08/922,718

[22] Filed: Sep. 3, 1997

Related U.S. Application Data

[60] Continuation-in-part of application No. 08/672,418, Jun. 28, 1996, Pat. No. 5,701,227, which is a division of application No. 08/360,982, Dec. 20, 1994, Pat. No. 5,602,532.

[51] Int. Cl.$^6$ .................................................. H01C 7/12
[52] U.S. Cl. ........................................ 361/118; 361/656
[58] Field of Search .................................. 361/111, 118, 361/56, 91, 117, 627, 629, 633, 636–637, 639–640, 648, 650, 653, 655–656

[56] References Cited

U.S. PATENT DOCUMENTS 5,825,598  10/1998  Dickens et al. ............................ 361/42

*Primary Examiner*—Michael J. Sherry
*Attorney, Agent, or Firm*—Marger Johnson & McCollom, P.C.

[57] ABSTRACT

An electrically powered annunciating system, for use in electrical panel boxes, having a sensing circuit including a first acoustic transducer to transmit a sonic signal to an annunciating circuit having a second acoustical transducer at a spaced distance from the first transducer to operate the annunciating circuit responsive to a sonic signal received from the first transducer. The sensing circuit powers the first acoustical transducer to produce a sonic signal responsive to a sensed electrical event such as termination of power to an electrical component. The annunciating circuit includes a tuned amplifier for signal purification and amplification, a time delay integrator to prevent accidental circuit operation caused by noise and an annunciator and a communication interface activated responsive to a sonic signal received by the second transducer. The annunciating system is particularly adapted for use in electrical panel boxes having multiple electrical components that are coupled by post and bus bar type connections, to alleviate the use of flexible wiring in the box for annunciating circuits.

8 Claims, 4 Drawing Sheets

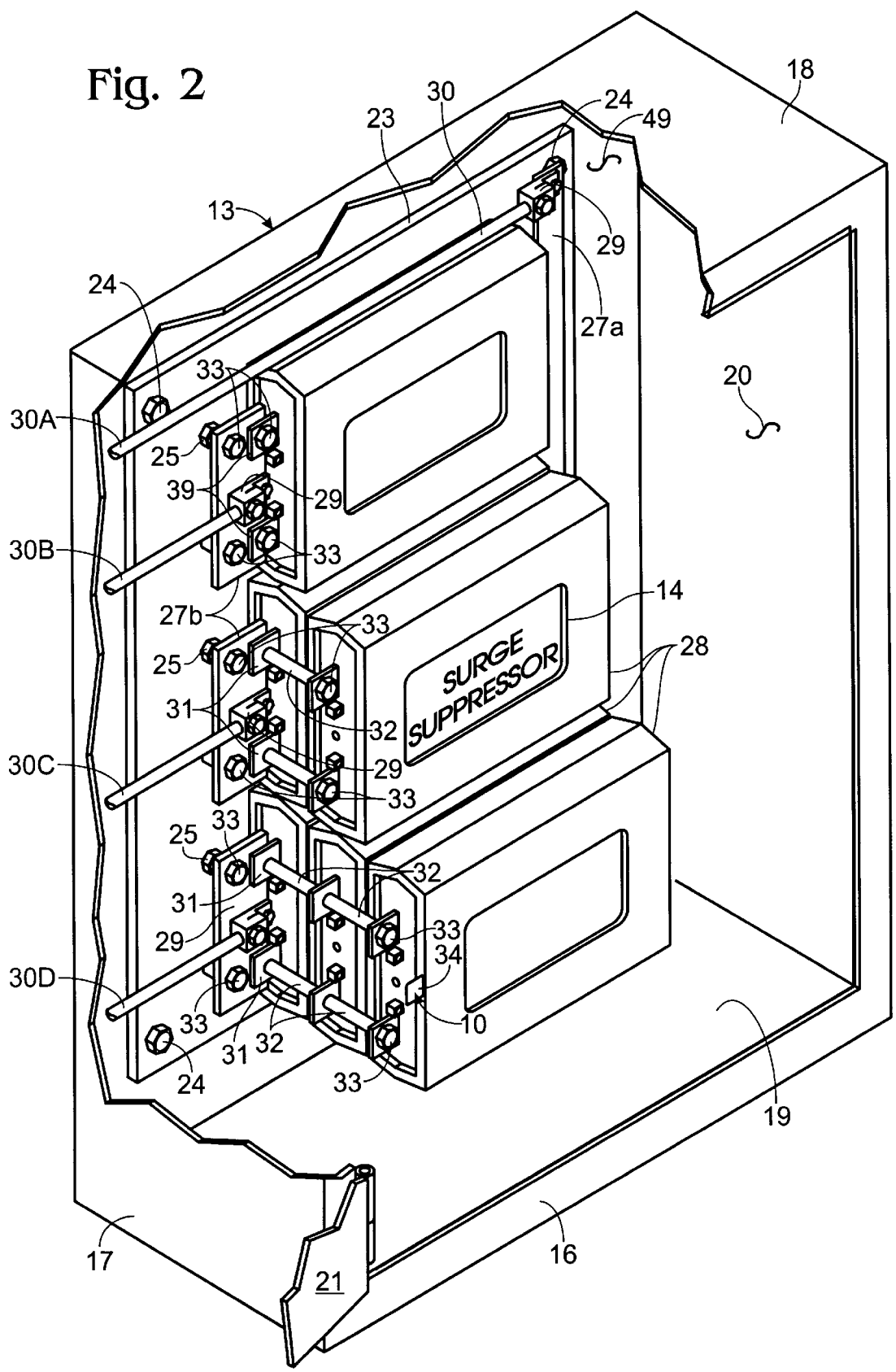

POWER SURGE PROTECTION ASSEMBLY

This is a continuation-in-part patent application of prior application Ser. No. 08/672,418 filed on Jun. 28, 1996, now U.S. Pat. No. 5,701,227, of Barry D. Ryan entitled AUDIO COUPLED ANNUNCIATING SYSTEM FOR ELECTRICAL PANEL BOXES,(POWER SURGE PROTECTION ASSEMBLY, as amended), which is a divisional of Ser. No. 08/360,982, filed Dec. 20, 1994, now U.S. Pat. No. 5,602,532 issued Feb. 11, 1997.

FIELD OF INVENTION

This invention relates generally to an assembly for coupling surge suppression devices together in electrical boxes.

BACKGROUND AND DESCRIPTION OF PRIOR ART

In the recent past, it has become popular to use a modular design of components in electrical panel boxes. Such modular design is conducive to post and bus bar type support and electrical interconnection of components to provide a safer, lower cost and more reliable electrical panel that allows ready replacement, changes, removal and addition of components. This type of design does away with or substantially reduces the use of flexible wiring, and the design gains much of its advantage by reason of this. The post and bus bar type interconnection of components in panel boxes, however, generally relates only to primary circuitry for the electrical components, but yet various secondary sensory and annunciating circuitry is common or necessary in such boxes for practical utility to determine and make known their operational states and happenings.

The post and bus bar type architecture is more useful and practical in electrical networks having fewer electrical communications and especially in such networks where several of the electrical communications are of a common nature. Such architecture is not well adapted to electrical networks having a larger numbers of individual electrical interconnections that are not of a common nature such as normally exist in sensing and annunciating circuits. Responsively in the past, sensing and annunciating systems commonly have been wired with flexible insulated wiring, even in electrical systems using post and bus bar-type architecture for primary circuitry.

The instant invention deals with this problem by providing sensing circuits associated with various individual components of an electrical panel box that communicate with one or more annunciating circuits at a distance therefrom by audio linkage that does not require wiring or other linking hardware between the two circuits. Such a system allows the use of the post and bus bar architecture for primary electrical circuits and does away with the necessity of flexible wiring for sensing and annunciating circuitry carried in panel boxes, but yet allows dealing with sensing and annunciating functions in substantially the same fashion as if flexible wiring were used.

Sound has been used to transmit various information at least as long as speech has existed and its use to couple various electrical systems, or various parts of a single electrical system, also has heretofore become known. Sound waves and especially the so called "ultrasonic waves", having frequencies above the limits of human hearing or in excess of about twenty kilocycles per second, have been used in connection with electronic circuitry in various types of alarm devices, door opening and unlocking devices, switching devices and other similar devices. It is not known, however, that sonic coupling has been used to eliminate wiring in electrical panel boxes, especially in sensing and annunciating circuitry.

The instant invention is particularly applicable to electric panel boxes having plural modular elements interconnected in spaced stacked arrays by bus bar and post-type architecture. The bus bar and post architecture provides stable supporting and electrical interconnection of elements, but uses posts and bars that normally do not have surface insulation. Because of this, the use of flexible insulated wiring in such boxes not only is physically difficult by reason of the presence of bus bars and posts, but also is more dangerous because of the hazard of the secondary wiring's insulation becoming corrupted by means of normally present mechanical, thermal and electrical forces that may cause shorting to the bus bars and posts. These hazards become enhanced in surge protectors with spaced stacked arrays of modular elements because of the generally hostile electrical environments in which these elements often exist and the sensitive nature of the electronic components that they contain and protect. The instant invention is particularly designed for use in such applications, especially at remote locations where access may be difficult. My invention resides not in any one of these particular features, but rather in the synergistic combination of all of its structures that gives rise to the functions necessarily flowing therefrom as specified and claimed.

SUMMARY OF INVENTION

My annunciating system provides a sensing circuit that presents an electrical current to activate a first transmitting acoustical transducer responsive to an electrical event to be annunciated. A receiving circuit provides a second receiving acoustical transducer at a spaced distance from the first transmitting transducer to receive the transmitted acoustical signal and responsively generate a current that is passed through a tuned amplifier to purify and enhance it about a particular frequency. The amplifier output is passed through a time delay integrator to selectively classify signals according to predetermined conditions to prevent noise or accidental transients from activating annunciation. Upon fulfillment of the predetermined conditions of the integrator, the signal is passed to a switching device which passes current to operate an annunciator and communication interface device if desired. The sound transmitted between the first and second transducers preferably is in the four kilocycle per second range.

The transducers that couple the sensing and annunciating circuits must acoustically communicate and preferably are carried within an electrical panel box of the type defining a normally closed chamber for electrical components, and especially an electrical panel box that houses stackable modular components that are primarily interconnected by bus bar and post architecture.

In providing such an annunciating system, it is:

A principal object to create an electrically powered, acoustically coupled system for use in an electrical panel box that provides a first acoustical transducer in a sensing circuit that transmits an acoustical signal to a second acoustical transducer, at a spaced distance from the first transducer, that responsively activates annunciating circuitry without any hard wiring between the transducers.

A further object is to provide such a system that has an annunciating circuit that includes a tuned amplifier to enhance and purify the transduced acoustic signal and a time delay integrator that classifies signals and passes current to institute annunciation only when predetermined conditions are met, to avoid accidental annunciation caused by noise or transients.

A yet further object is to provide such a system that is adapted for use in electrical panel boxes containing spaced arrays of stacked modular electrical components that are primarily interconnected by post and bus bar type architecture so that the annunciating system requires no flexible wiring in the panel box to transmit information between its sensing circuitry and its spacedly distant annunciating circuitry.

The stackable surge suppression boxes are provided in different sizes according to the amount and type of required surge suppression protection. The different sized suppression boxes are interchangable within the same electrical panel and are stackable side-by-side or on top of each other. The different sized surge suppression boxes allow more customized surge suppression protection within the limited space of a standardized electrical panel.

The components inside the surge suppression box are arranged to increase the amount of surge suppression protection that can be provided within a given amount of space. A first conductor extends from the first side of the suppression box and a second conductor bus extends from a second side of the suppression box. A first substantially flat elongated bus bar extends from the first conductor along substantially an entire length inside the suppression box. A second substantially flat elongated bus bar extends from the second conductor along substantially the entire length of the suppression box and overlaps the first bus bar.

Multiple metal oxide varistors (MOVs) are coupled at a first end to the first bus bar and coupled at a second end to the second bus bar. The MOVs are coupled in parallel between the first and second bus bar along the entire length of the surge suppression box. The overlapping first and second bus bars allow more MOVs to be used inside a smaller surge suppression box. Because a smaller surge suppression box can be used, modular surge suppression units can be assembled in a greater variety of arrangements inside the electrical panel for more customized power surge protection.

A still further object is provide such a system that uses acoustical transducers of small size so that they may be readily contained in or supported upon primary modular components without disrupting the function, purpose or architecture of those primary modular components.

A still further object is to provide such a system that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment of the best known mode being illustrated in the accompanying drawings, as is required.

BRIEF DESCRIPTION OF THE DRAWINGS

In the accompanying drawings which form a part hereof, and wherein like numbers of reference refer to similar parts throughout:

FIG. 2 is a somewhat enlarged, partially cut-away isometric view of the electrical panel box of FIG. 1, with the cover open to show the box contents.

DESCRIPTION OF THE PREFERRED EMBODIMENT

Figure 4:
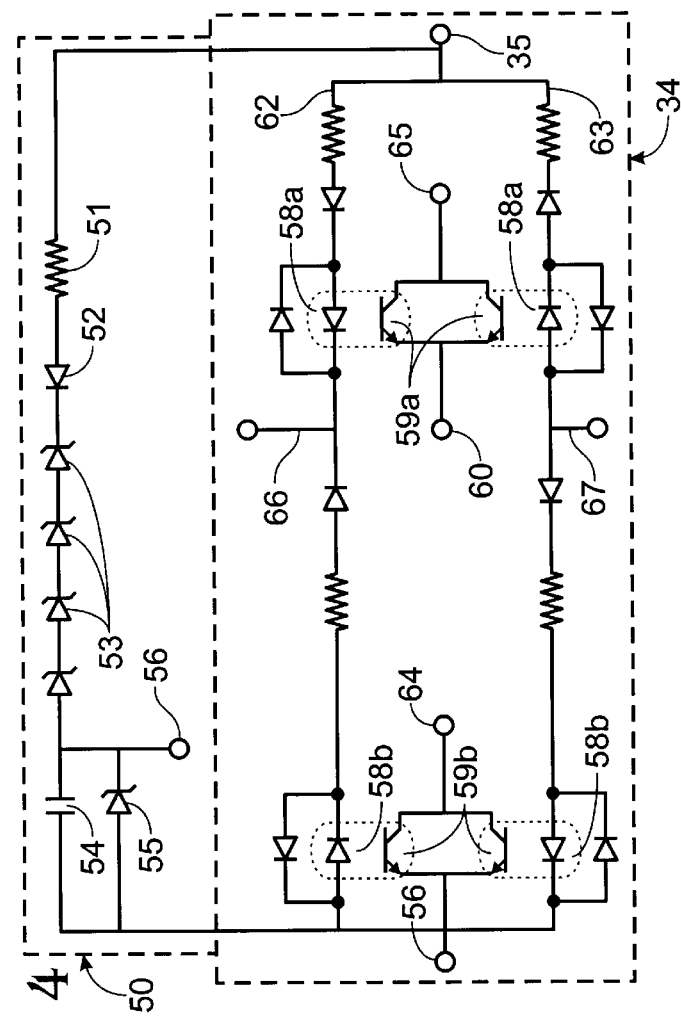
FIG. 4 is an electrical diagram in normal symbology of the detailed circuitry of the preferred activating circuit.

My annunciating system generally provides activating circuit 10 having a first transmitting acoustical transducer at a spaced distance from a second receiving acoustical transducer carried in annunciating circuit 11, which responsive to sonic signals from the first transducer activates annunciating devices 12. The annunciating circuitry 11 is carried in panel box 13 which encases surge suppressing blocks 28 that carry activating circuits 10 within their casements.

Panel box 13 is a rigid, peripherally defined, generally rectilinear box formed by structurally joined back panel 15, front panel 16, similar side panels 17, top panel 18 and similar bottom panel 19. The front panel 16 defines orifice 20 that is selectively covered by door 21 to enclose chamber 49. The panel box elements define various orifices as required for the passable of connectors and indicators from chamber 49 externally of the box. This essential structure is well known and common in many electrical panel boxes in present day use.

As seen particularly in FIG. 2, chamber 49 of the panel box houses mounting plate 23 structurally carried on the inner surface back 15 by plural nut and bolt combinations 24. Mounting plate 23 supports a plurality of variously arrayed electrically insulative mounting posts 25, which in turn support various bus bars 27. Bolts 33 communicate between mounting plate 23 and mounting posts 25 and between mounting posts 25 and bus bars 27 to positionally maintain these elements in various arrays relative to each other and to maintain the electrical independence of the bus bars from the mounting plate.

In the instance illustrated in FIG. 2, the single elongate neutral bus bar 27a is arrayed spacedly distant from three spaced bus bars 27b to mount single or stacked arrays of surge suppressing blocks 28. Each bus bar 27 carries a connector 29 to interconnect a neutral from conductor 30A and three phase power from electrical conductors 30B, 30C and 30D that extends exteriorly of the panel box through an orifice therein.

Each of the surge suppression blocks 28 contains a surge suppressor 14 alternatively referred to as an electrical device and provides block conductor buses 31 extending from each end to interconnect with opposed bus bars 27a and 27b respectively. A plurality of surge suppressing blocks 28 may be maintained in spaced stacked array and electrical communication by plural electrically conductive connector posts 32 extending between adjacent connector buses 31. Connector posts 32 are releasably interconnected with conductor buses 31 by bolts or studs as may be required threadedly extending therebetween.

The connector buses of the surge suppressing block most proximal to mounting plate 23 are maintained on the associated bus bars 27 by bolts or studs 33 extending fastenably therebetween.

It is with this type of post and bus bar architecture for interconnected modular electrical components that my annunciating system is particularly adapted to operate, though it is operative in other panel box architectures with either post and bus bar or insulated flexible wire interconnections.

Figure 3:
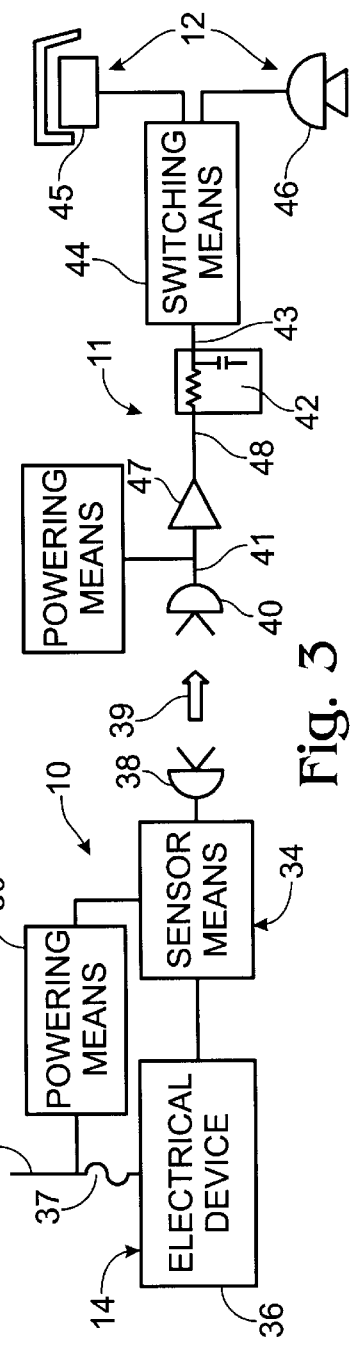
FIG. 3 is a flow-type electrical diagram in normal symbology of the overall circuitry of my annunciator.
Figure 1:
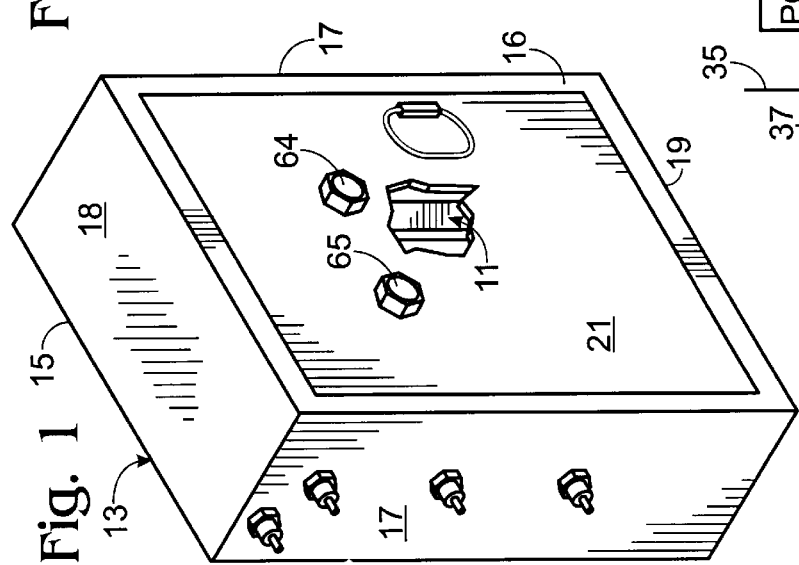
FIG. 1 is a partially cut-away isometric surface view of an electrical panel box within which my annunciating system is designed to operate.

My annunciating system, as seen in the diagram of FIG. 3, provides actuating circuit 10 with power supply means 50, sensor means 34 and transducer 38 connected with the power supply line 35 of electrical device 36 which may sustain an electrical happening that is to be annunciated. The electrical device 36 is powered by supply line 35 and is protected by fuse 37 in that line outwardly of the electrical device 36 and the interconnection of my annunciating circuit therewith.

As seen in FIG. 4, power supply means 50 provides resistor 51, rectifying diode 52 and plural Zener diodes 53 with parallel capacitor 54 and diode 55 to provide a direct current preferably of 12 volts. This voltage is output through lead 56 to power the transmitting transducer 38.

The sensing means 34 in the device illustrated in FIG. 4 provides two parallel circuits 62 and 63 between the power input line 35 and ground line 56 of the power supply. Each of circuits 62 and 63 have two sets of paired light emitting diodes 58a and 58b coupled respectively with light sensing transistors 59a and 59b to electrically isolate the connection between these elements. Each of the paired light sensing transistors 59a are interconnected between their collectors to red light emitting diode 65 are interconnected between their emitters to transducer 38 and output by lead 56. The light sensing transistors 59b are interconnected between their collectors to power green operating light 64. The two parallel circuits 62 and 63 with their reversed rectifying diodes provide full wave operation for the sensing means.

An electrical device to be sensed is interconnected by leads 66 and 67 between the pairs of light emitting diodes and light sensing transistors of parallel circuits 62 and 63. If the electrical device does not receive power, such as by reason of a blown fuse, the event powers diode 65 and transducer 38 interconnected in electrical series between leads 56 and 60. The physical location of transducer 38 preferably is in a chamber defined by a casement of an electrical device that is serviced. Wherever transducer 38 is carried, however, care must be taken to assure that sound waves produced by that transducer may exit from any associated casement and pass into chamber 49 defined by panel box 13 or elsewhere to activate the annunciating circuit.

Sonic waves 39 generated by transmitting transducer 38 pass through the atmosphere in chamber 49 defined by panel box 13 to receiving acoustical transducer 40 carried in annunciating circuit 11. The receiving transducer 40 produces an electric signal responsive to the impinging sonic waves and passes that electric signal through line 41 to tuned amplifier 47. The tuned amplifier, after filtering the signal to purify it and amplifying it to enhance its strength at a particular frequency, similar to the sonic waves received, passes the modified signal through line 48 to time delay integrator 42. The time delay integrator 42 requires predetermined electrical conditions, that when met by the electric signals presented to it, allow passage of current through line 43 to switching device 44 to prevent accidental operation caused by noise or transients. In the instance illustrated, if sound persists for a sufficient period of time, the condenser of the integrator becomes charged and the voltage passed therefrom raises to a level that triggers the switching device.

Switching device 44 responsively passes electric current to power annunciator 45 and communication equipment interface 46 to annunciate the happening of the sensed event. The time delay integrator 42 will require an activating signal, or a number of signals, over an appropriate time interval for activation, and its components may be variable to allow change in these parameters as heretofore known.

The individual components of the annunciating circuit and their use are known per se and those components may be selected for particular desired parameters from such devices available in the present day marketplace.

Receiving transducer 40 is carried within the chamber 49 defined within panel box 13 so that transducer 40 may receive acoustical signals from transmitting transducer 38 through the atmosphere in that chamber. The positioning of both transducer elements normally is at a distance from each other for my device to be useful, but that positioning must be such that the required acoustical linkage may be accomplished. Normally, the various electrical components of the annunciating circuit 11 are contained in close proximity in a casement. This annunciating circuit casement can be located anywhere within an electrical box and in the embodiment illustrated is located on the internal surface of door 21. Annunciating devices 12 communicate through the box to allow visual inspection.

Often panel boxes in which my annunciating device is used may be in remote unattended locations. If this be the case, communication interface device 46 may be used as an annunciating device to activate communications equipment, commonly of a radio or telephone type, to cause annunciation of a sensed event at a distant location. This type of interface device is well known and commercially available.

Having described the structure of a preferred embodiment of my annunciator, its operation may be understood.

An annunciating system, including activating circuit 10, annunciating circuit 11 and annunciating devices 12, is provided according to the foregoing specification.

I prefer that the acoustical transducers 38 and 40 be relatively small in size and operate in an audible acoustical range of approximately four thousand cycles per second, though this is not essential and any acoustical ranges that allow transmission of acoustical signals between transducers 38 and 40 are within the ambit and scope of my invention.

Both the elements of the activating circuit 10 and annunciating circuit 11 are preferably separately encased and each is placed at a spaced distance from the other, generally in areas of an electrical panel box where activity to be sensed and annunciated are to take place. In the embodiment illustrated, the activating circuitry 10 is contained within the casements of surge suppression blocks 28 and the annunciating circuitry 11 is carried within the panel box chamber 49 with light-type annunciators 64, 65 carried in orifices defined in the panel box to be visible exteriorly thereof. No wiring will be required between these encased circuits and my annunciating system therefore requires no flexible wiring interconnections within the chamber defined by the panel box.

As an event to be annunciated, such as breaking of a fusing link electrical device 36, sensing means 34 will sense that event and responsively transmit a signal to transmitting transducer 38 to responsively cause that transducer to emit sonic waves 39 within the chamber of the panel box 13. These sonic waves will be transmitted through that chamber and to receiving transducer 40 which responsively will transmute the sonic energy into an electric signal which will be passed through line 41 to tuned amplifier 47 which amplifies and purifies that signal in a predetermined frequency range. The enhanced signal then is passed through line 48 to time delay integrator 42. When the appropriate precedent conditions of the time delay integrator have been met and its condenser appropriately charged, it will raise the output voltage to operate switching devices 44 which responsively activates annunciator 45, communication interface 46 and indicator lights 64, 65 to cognizably annunciate the occurrence of the sensed event at the panel box and at a distance.

From the foregoing description, it is to be noted that if a plurality of my annunciating devices are to be carried within a single panel box, acoustical signals used by each may be at different frequencies so that one transmitting transducer will activate only its frequency mated receiving transducer to annunciate an event only in the electrical device associated with those two transducers. This allows singulated data as to a particular electrical device that is a member of a group of such devices in a single box. In other applications, if it be desired to annunciate only the sensation of an event in any one of a plurality of electrical components, only one receiving transducer need be used with a plurality of frequency mated transmitting transducers in each of the electrical devices to be sensed. Various other permutations and combinations of frequency matings of transmitting and receiving transducers are also within the ambit and scope of my invention.

Figure 5:
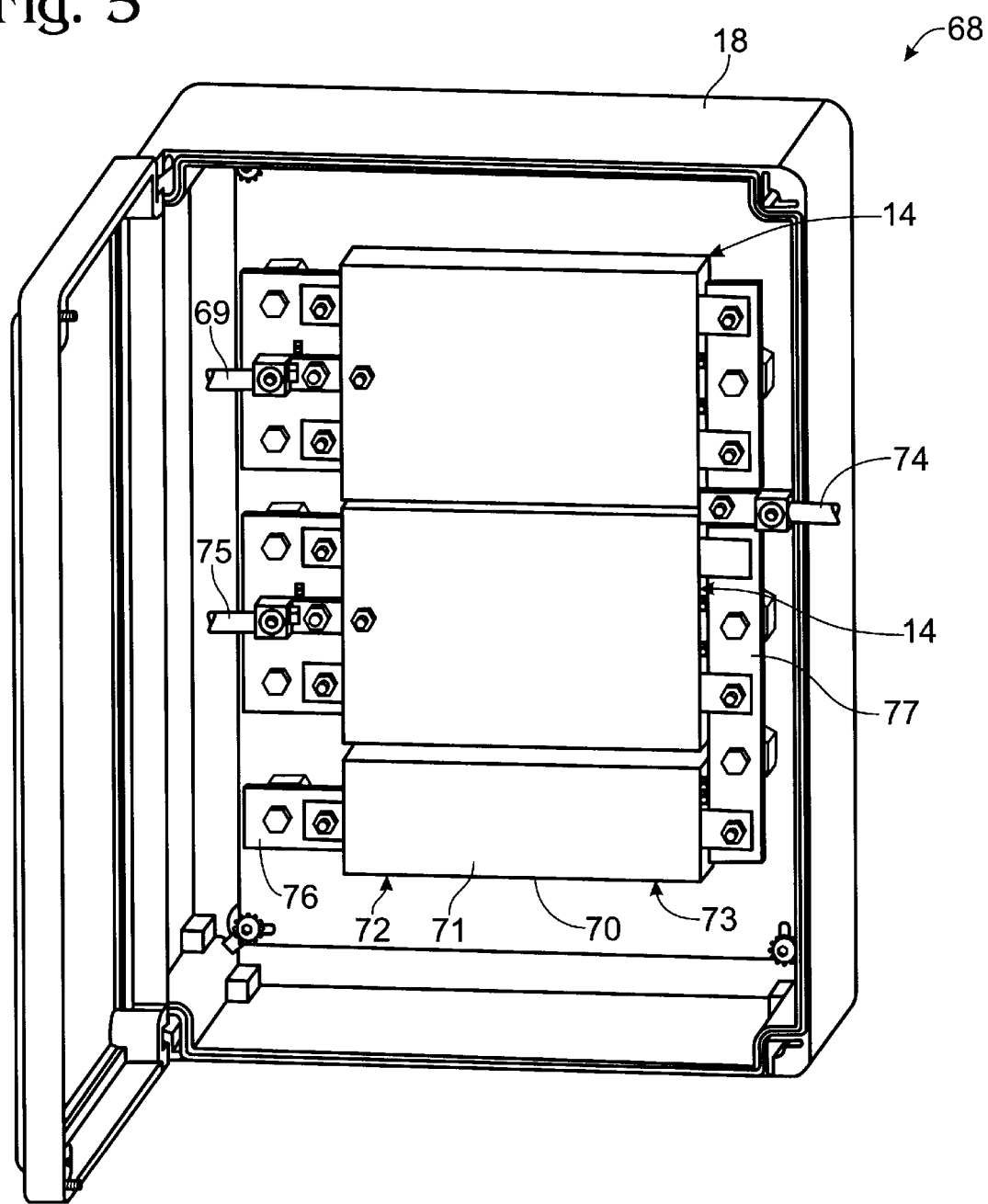
FIG. 5 is a perspective view of two different sized surge suppression boxes attached side-by-side inside an electrical panel.

Referring to FIG. 5, a power surge protection assembly 68 includes multiple components 14 also referred to as suppression boxes 14 similar to those shown in FIG. 2. The surge protection assembly 68 also includes a half-sized suppression box 70 connected side-by-side with suppression boxes 14. The suppression box 70 includes power surge protection components 72 shown in detail in FIG. 6. The suppression box 70 is the same length as the suppression boxes 14 but approximately half the width.

The suppression boxes 70 can include the annunciation circuitry shown in FIG. 3 and the multi-level monitoring circuitry described in co-pending application entitled: A POWER SURGE SUPPRESSION SYSTEM WITH MULTI-LEVEL STATUS ANNUNCIATION CIRCUITRY, Ser. No. 08/688,327 filed Jul. 30, 1996, which is herein incorporated by reference.

The smaller sized suppression box 70 is coupled between a neutral line 74 via bus bar 77 and ground via bus bar 76. The suppression box 70 comprises flat elongated top and bottom surfaces 71 and sides 73 that extends perpendicularly from the top to the bottom surfaces 71. The smaller size of suppression box 70 in relation to suppression box 14 allows a wider variety of power surge protection arrangements. For example, the larger suppression boxes 14 provide additional surge suppression protection between power lines 69 and 75 and neutral line 74. The smaller suppression box 70 can be used to provide additional power surge protection between the neutral line 74 and ground. With the three phase power applications, the smaller suppression box 70 also can provide line to line, line to neutral, and neutral to ground power surge protection. The smaller size of the suppression box 70 allows insertion in panel boxes that also include service entrance, transfer switch and load center systems.

Figure 6:
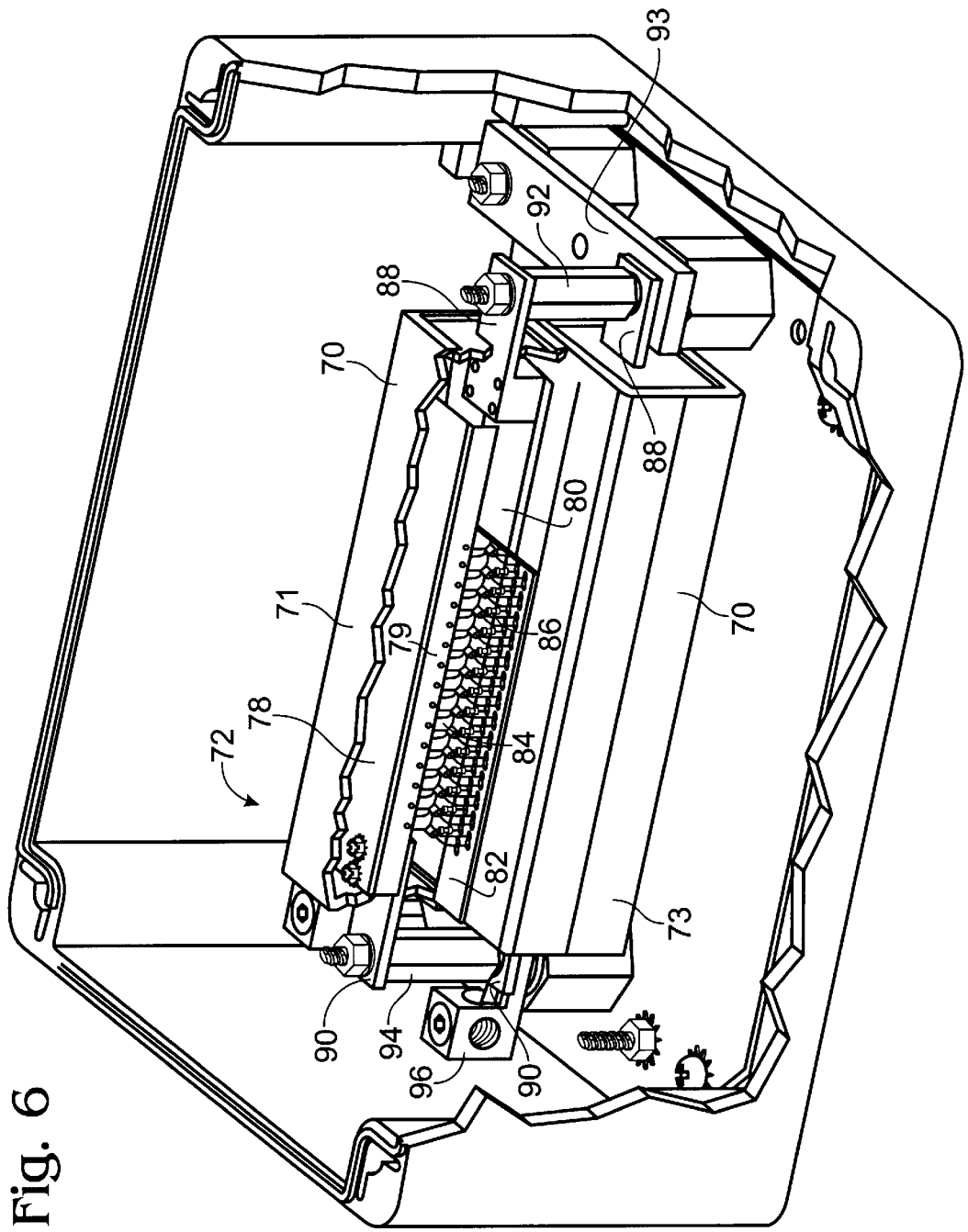
FIG. 6 is a perspective cut-away view of two half-sized surge suppression boxes inside an electrical panel.

Referring to FIG. 6, two suppression boxes 70 are vertically coupled together at a first end by a connector post 92 and at a second end by a connector post 94. The post 92 electrically couples the conductors 88 together with bus bar 93 that is coupled to ground. The post 94 electrically couples the conductors 90 together with a terminal 96 coupled to a neutral line 74 (FIG. 5).

The suppression box 70 includes a substantially flat elongated rectangular bus bar 80 extending from the conductor 88 underneath a printed circuit board 82 along substantially the entire length of the suppression box 70. A second substantially flat elongated bus bar 78 extends from the conductor 90 along substantially an entire length of the suppression box 70 overlapping the first bus bar 80. Multiple metal oxide varistors (MOVs) 84 are coupled in parallel between a flange 79 extending downward from the side of bus bar 78 and bus bar 80. The MOVs 84 extend along substantially the entire length of the two bus bars 78 and 80 via printed circuit board 82.

Multiple resistors 86 are each electrically coupled at a first end with an associated one of the MOVs 84 and coupled at a second end to a multi-level monitoring circuit described in co-pending patent application, Ser. No. 08/688,327. The unique overlapping arrangement of the elongated bus bars 78 and 80 allow a larger number of MOVs 84 to be populated inside a relatively small suppression box 70. The MOVs 84 in suppression box 70 provide over 3000 joules of surge suppression protection.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A power surge protection assembly, comprising:

a suppression box for encasing a power surge suppression circuit, the box having a top surface, a bottom surface, a first side and a second side;

a first conductor extending from the first side of the box;

a second conductor extending from the second side of the box;

a first elongated post having a first end electrically coupled to the first conductor and a second end electrically coupled to a first power line;

a second elongated post having a first end electrically coupled to the second conductor and a second end electrically coupled to a second power line;

a first substantially flat elongated bus bar extending from the first conductor along substantially an entire length of the suppression box; and a second substantially flat elongated bus bar extending from the second conductor along substantially the entire length of the suppression box and overlapping the first bus bar wherein the second bus bar is coupled to a printed circuit board that extends longitudinally along substantially the entire length of the second bus bar, the printed circuit board retaining multiple surge suppression devices each at a first end to the first bus bar and coupled at a second end to the second bus bar.

2. An assembly according to claim 1 wherein the top and bottom surfaces are substantially square and the sides extend between the top and bottom surfaces.

3. An assembly according to claim 1 wherein the top and bottom surfaces are elongated and the sides extend perpendicularly between the top and bottom surfaces.

4. An assembly according to claim 1 wherein the first bus bar is coupled to multiple metal oxide varistors that extend longitudinally along substantially the entire first bus bar.

5. A power surge protection assembly, comprising:

a suppression box for encasing a power protection circuit, the box having a top surface, a bottom surface, a first side and a second side;

a first conductor extending from the first side of the box;

a second conductor extending from the second side of the box;

a first substantially flat elongated bus bar extending from the first conductor along substantially an entire length inside the suppression box; and a second substantially flat elongated bus bar extending from the second conductor along substantially the entire length inside the suppression box and overlapping the first bus bar.

6. An assembly according to claim 5 including multiple surge suppression devices each coupled at a first end to the first bus bar and coupled at a second end to the second bus bar.

7. An assembly according to claim 6 wherein the first bus bar is coupled to a neutral line and the second conductor is coupled to ground.

8. An assembly according to claim 5 wherein the suppression box comprises a first box having top and bottom surfaces with an elongated rectangular profile and including a second box substantially twice the width of the first box and substantially the same length as the first box, the second box having a first conductor extending from a first side and electrically coupled to a neutral line and a second conductor extending from a second side and electrically coupled to a power line.

* * * * *